June 13, 1933. T. V. BUCKWALTER 1,913,744
SECURING MEANS FOR SPLIT AXLE HOUSINGS AND THE LIKE
Filed June 25, 1931
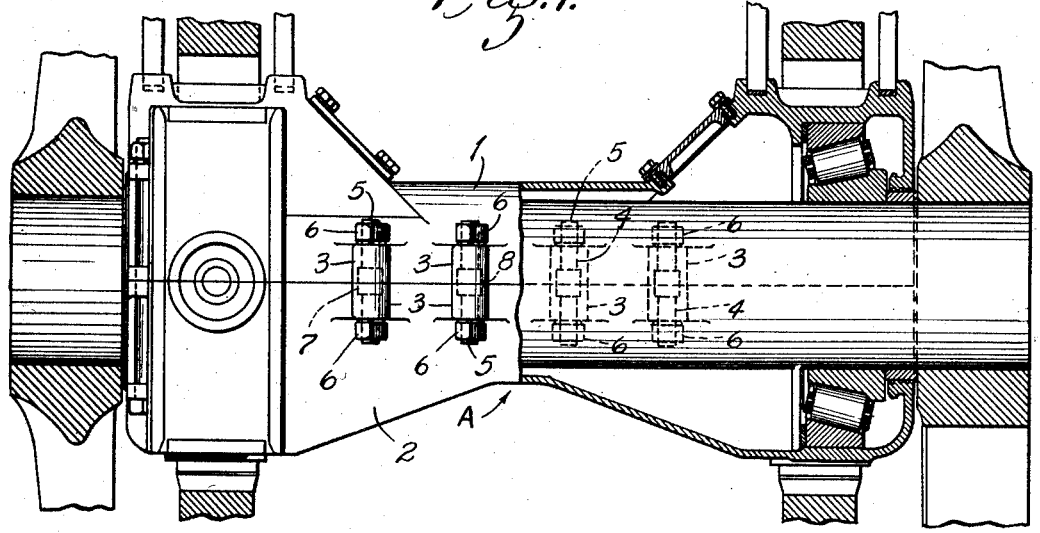
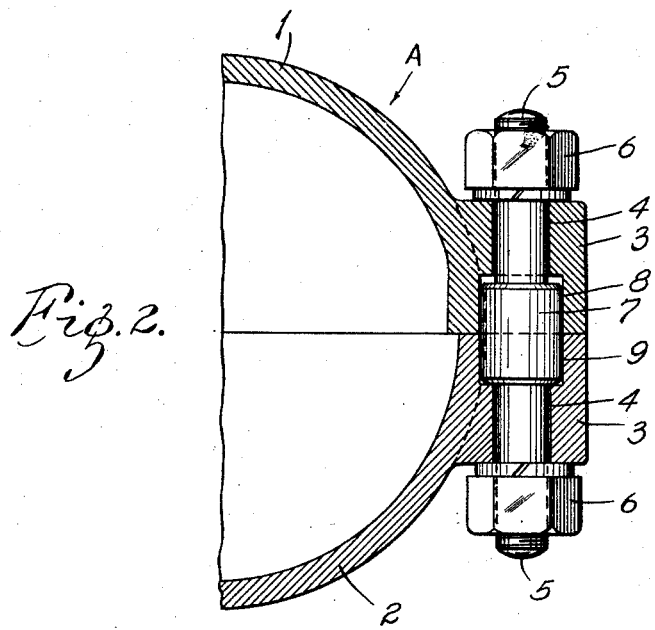
INVENTOR:
Tracy V. Buckwalter,
by Cadwalader Gravely,
HIS ATTORNEYS Patented June 13, 1933

1,913,744

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

SECURING MEANS FOR SPLIT AXLE HOUSINGS AND THE LIKE

Application filed June 25, 1931. Serial No. 546,735.

My invention relates to means for securing together the parts of split axle housings and the like. It is adapted, for example, for use in securing together railway axle housing members of the kind shown in my application Ser. No. 499,679. It has for its principal objects a construction that firmly secures the parts together, that permits easy removal of the parts and that provides a centering or guiding means for assembling the parts. The invention consists principally in a securing means provided with an enlargement on its body portion adapted to fit in enlarged bores of the housing members that it secures together. The invention further consists in the securing means for split axle housings and the like and in the parts and combinations and arrangements of parts hereinafter described and claimed.

In the accompanying drawing,

Fig. 1 is an elevation of a split railway car axle housing provided with securing means embodying my invention; and Fig. 2 is a detail vertical sectional view showing one of the securing means.

The axle housing construction for railway rolling stock shown in the enclosed drawing is adapted for use with conical roller bearings or other antifriction bearings. The housing A is split along a horizontal line, comprising an upper half housing 1 and a lower half housing 2. Along their meeting edges said housing members 1 and 2 are provided with lugs 3 having bores 4 through which extend vertical securing bolts 5 provided with nuts 6 on the ends.

Each securing bolt 5 is provided with a cylindrical enlargement 7 at about the middle thereof and the lower portion 8 of the bore 4 of each upper lug 3 and the upper portion 9 of the bore 4 of each lower lug 3 is counterbored or enlarged to receive snugly said enlargements 7 on said bolts 5, the bodies of said bolts 5 fitting somewhat loosely in the bores 4 beyond said enlarged bores.

In assembling the construction, the lower axle housing member 2 is placed in position and the bolts 5 positioned in the lugs thereof. The vertically projecting bolts 5, firmly held in position in the lugs 3 of the lower housing member 2 constitute centering or guiding means that facilitate proper positioning of the upper housing 1 on the lower housing with the bolts 5 projecting through the upper lugs 3, after which the upper nuts 6 are positioned to securely fasten the parts together. Removal of the upper housing member for inspection or repair purposes is easily accomplished and leaves the bolts in position to constitute centering means when the parts are reassembled.

What I claim is:

Securing means for split axle housings comprising perforated lugs on said housings, said lugs having opposed counterbored portions symmetrically disposed with respect to the housing axis in their opposing faces and securing bolts extending through said lugs, said bolts each having an enlarged middle portion received in said counterbored portions of said lugs.

Signed at Canton, Ohio, this 19th day of June 1931.

TRACY V. BUCKWALTER.